Oct. 11, 1966
R. E. KNOX
3,278,667
PREPARATION OF POLYURETHANE SHEET ELASTOMERS AND COATED SUBSTRATES
Filed April 25, 1963
2 Sheets-Sheet 1
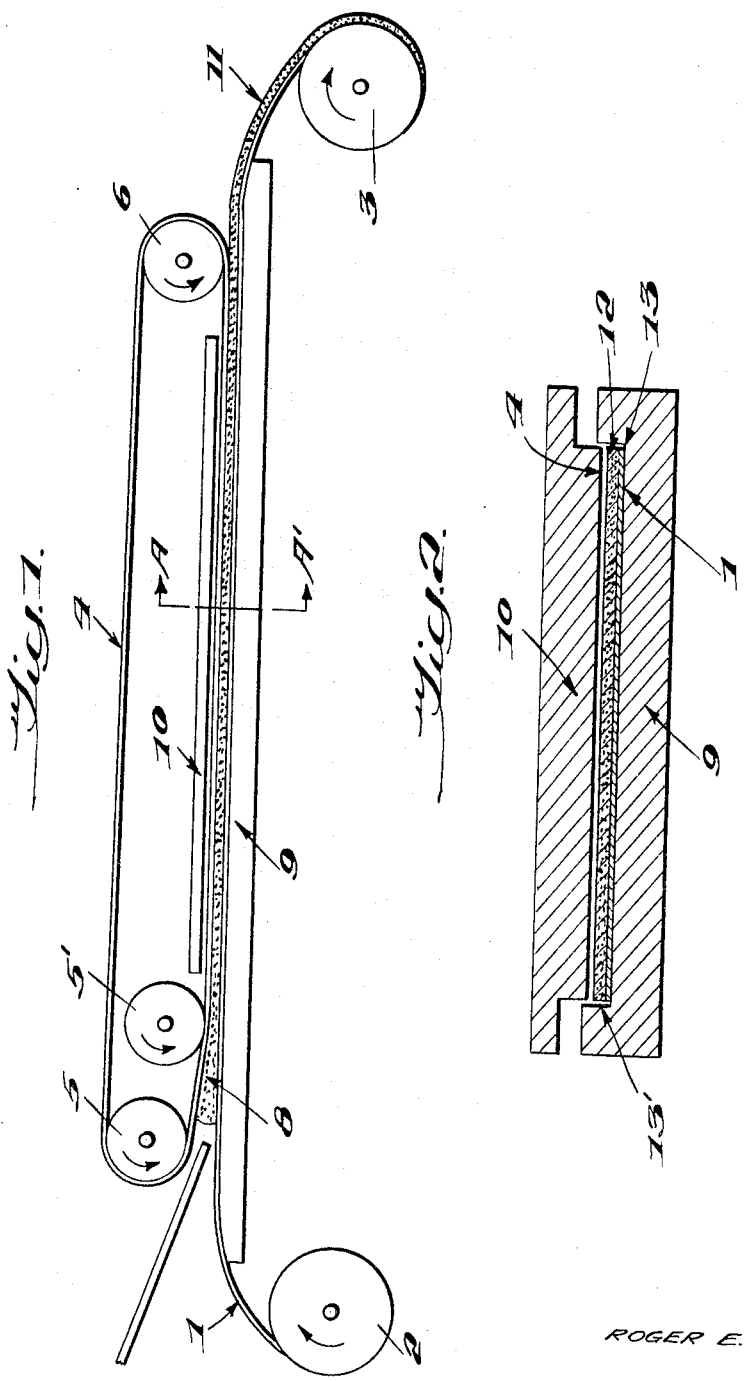
INVENTOR
ROGER E. KNOX,
BY William B. Cudlin, Jr.
AGENT

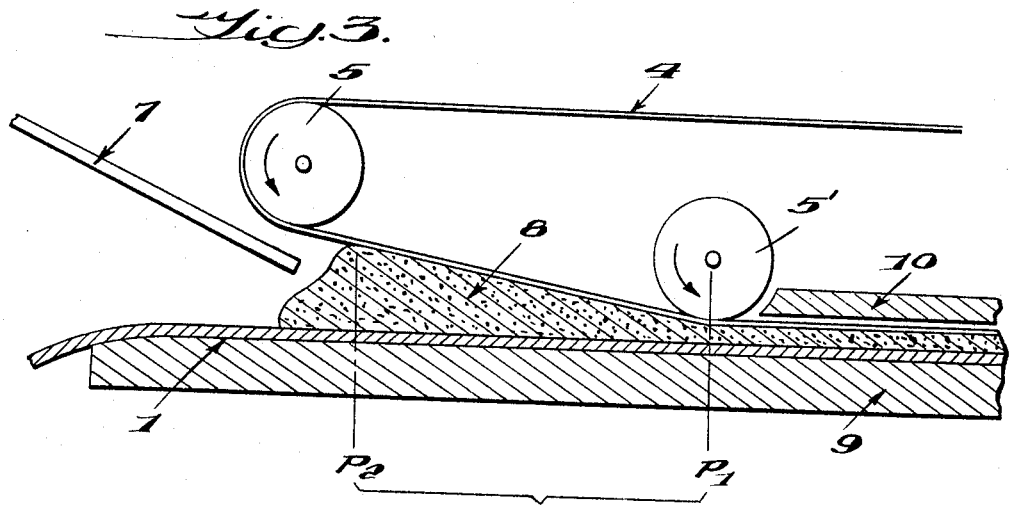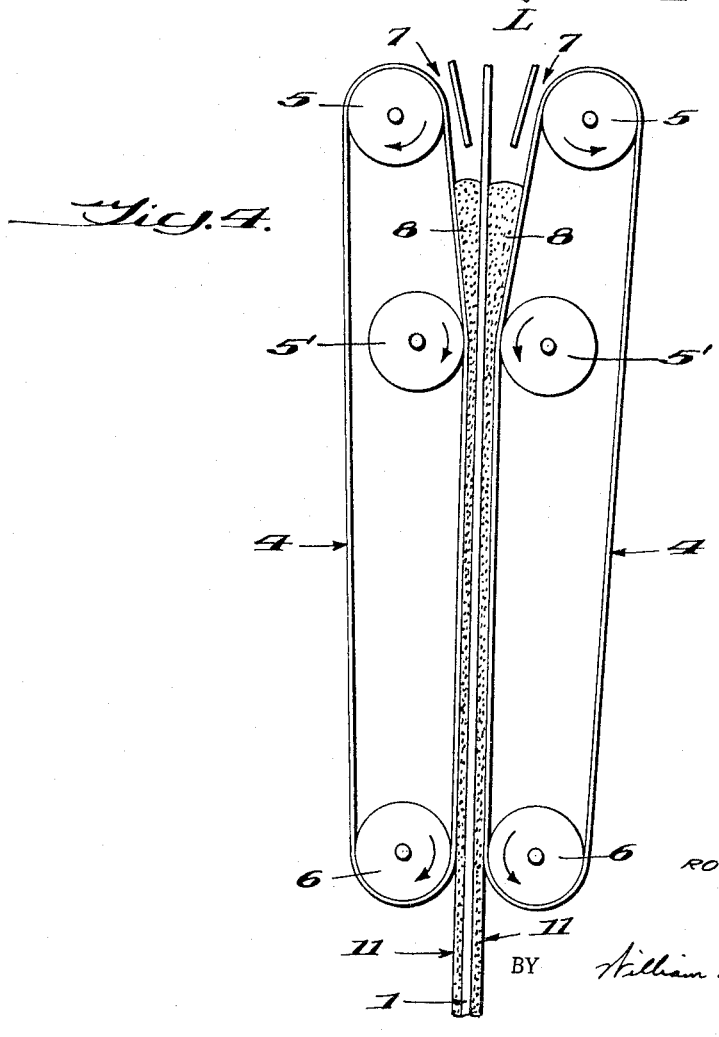

United States Patent Office 3,278,667
Patented Oct. 11, 1966

3,278,667
PREPARATION OF POLYURETHANE SHEET ELASTOMERS AND COATED SUBSTRATES
Roger E. Knox, Claymont, Del., assignor to E. I. du Pont de Nemours and Company, Wilmington, Del., a corporation of Delaware
Filed Apr. 25, 1963, Ser. No. 275,728
7 Claims. (Cl. 264—171)

This invention relates to a process for the preparation of polyurethane sheet elastomers and polyurethane elastomer coated substrates. More particularly this invention relates to a process for preparing polyurethane sheet elastomers and polyurethane elastomer coated substrates from self-curable liquid polyurethane precursors.

Polyurethane elastomers are noted for their outstanding abrasion resistance, high tensile strength and general toughness. These properties suggest the use of polyurethane elastomers in mechanical goods. More specifically in regard to the present invention, these properties suggest the use of polyurethane elastomers in the form of impregnated or coated fabrics and other coated substrates in applications such as conveyor belts, linings for chutes or pneumatic conveyors handling abrasive materials, slings for cargo handling, webbing for aircraft arresting systems and similar goods. Commercialization of polyurethane elastomer coated materials in such applications has been delayed because no reliable method of coating with these elastomers has been available. Attempts to adapt existing types of rubber or plastics coating equipment for use in preparing polyurethane elastomer coated substrates have not been satisfactory because the self-curing liquid polyurethane elastomer precursors are not stable liquids. As a result, they gel quickly or start to cure once they are formed. This is in opposition to the behavior of conventional elastomers and plastics which are normally used in coating. These latter substances generally are stable for prolonged periods of time. Roll coasters, dip coaters, calenders, knife coaters, air-knife coaters and casters have been considered for applying polyurethane elastomers to fabrics and other substrates, but all of these pieces of equipment require a substantial hold-up, both time and volume-wise, of the coating material which is being applied. When these types of machines are employed with self-curing polyurethane elastomers, rapid fouling of the machine parts directly involved in applying the elastomer to the substrate takes place. Attempts to coat with conventional equipment making use of minimum quantities of precursor in an effort to avoid premature gelling or curing of precursor prior to application results in non-uniform coatings without entirely avoiding the fouling problems. Some of these problems may be avoided by using slow curing polyurethane precursors, but if this is done, excessively long cure times are involved which limits the rate at which material can be coated on a given line. Restriction to slow curing elastomers has the additional disadvantage of greatly restricting the choice of elastomers which may be applied to the substrate.

It is also desirable to prepare continuous sheets of solid polyurethane elastomers from self-curing polyurethane elastomeric precursors. However, such a preparation encounters similar difficulties as those for coating a substrate. For example, conventional processes for preparing a continuous sheet of rubber are inadequate for preparing a continuous sheet of an elastomer from a self-curing polyurethane precursor because of the rapid curing of the precursor which cures too fast and becomes unworkable before it can be passed through the conventional machinery.

It is an object of this invention to provide a novel process for the preparation of sheet elastomers from a self-curing polyurethane precursor. Another object is to provide a novel process to coat a substrate with a self-curing polyurethane precursor. Other objects will appear hereinafter.

These and other objects are accomplished by an improvement to a process for preparing solid elastomeric polyurethane material by passing the polyurethane between two sheets moving at the same speed and maintained at a predetermined separation, and containing the polyurethane between said sheets while the polyurethane cures to a tack-free state the improvement which comprises placing a self-curing liquid polyurethane precursor in a nip having an angle no greater than about 15° formed by the two sheets moving at the same speed and converging to a predetermined separation while maintaining a bank of said precursor in the nip of at least two inches as measured back from the first point where said sheets reach their narrowest point of convergence, with the proviso that the average residence time of the precursor in the nip being no greater than the work time for the precursor. After the polyurethane precursor has cured to a tack-free state, one or both of the sheets can be removed thereby respectively forming a coated material or a plain strip of the polyurethane material which can then be recovered. Both of the sheets can be left on the polyurethane material and a laminated strip of the polyurethane covered on each side by the sheets can be recovered.

The process of the present invention can be used to apply any polyurethane elastomer which is derived from a liquid self-curing elastomer precursor to any substrate in sheet form or to form a continuous sheet of the elastomer itself. The process may be used for impregnating fabrics with polyurethane elastomers as well as for applying coatings ranging from about several thousandths to about a quarter of an inch in thickness to fabrics and other substrates. If a substrate is desired, any material which can be produced in uniform sheets of continuous length may be used as the substrate in this invention. This includes all varieties of cloth, paper, plastic or any substance which may be formed into a sheet by weaving, knitting, felting, extruding and casting. Cloth formed from all types of fibers, both natural and synthetic, may be coated or impregnated by the present invention. Preferred fabrics include woven and non-woven materials derived from cotton, nylon, glass and polyethylene terephthalate fibers. Other substrates which are available in uniform sheet form and may be coated by the process of the present invention include plastics, metal, wood, plywood and various fiber boards. While some of these substrates do not come in continuous lengths, they can be butted end to end to form an essentially continuous length.

The polyurethane elastomers which are used in this process are restricted to those prepared from self-curing liquid polyurethane elastomer precursors. These liquid precursors are usually formed by mixing an isocyanato-teminated component, such as a polyether glycol capped with a diisocyanate, with a curing component containing at least two active hydrogens, such as diamine, a low molecular weight glycol or a triol. Various other ingredients may be added in minor amounts including catalysts to increase the rate of curing. Once the liquid mixture of the isocyanato group containing component and the curing component has been made, no other ingredient need be added to bring about a satisfactory cure from the liquid state to the finished polyurethane elastomer. A more complete description of the types of materials which may be employed in preparing liquid self-curing polyurethane elastomer precursors is presented hereinafter.

In order to describe the present process and associated equipment, reference is made to FIGURE 1 which represents a cross section of a preferred piece of equipment for carrying out the process of the present invention. In this particular diagram the equipment is used to coat a substrate but the equipment is easily converted to produce a continuous sheet without a substrate. Fabric or flexible substrate 1 which is to be coated with polyurethane elastomer feeds into the coating apparatus from a tensioned feed reel 2 and is drawn through the apparatus by powered takeup reel 3. If the substrate is in the form of rigid sheets, the sheets are forced through the machine. This automatically butts the individual sheets together snugly in the coating equipment. Release belt 4 traveling over rolls 5, 5' and 6 is driven or allowed to be pulled by contact with the uncured coated substrate so that it moves at a rate equal to the rate at which substrate passes through the machine. The release belt may be a fabric coated with a permanent release agent such as a copolymer of hexafluoropropene and tetrafluoroethylene or a polished metal belt which is treated continuously with a release agent such as hydrocarbon oils, as a polydimethyl siloxane oil or grease, or a high melting silicone or hydrocarbon wax such as paraffin waxes. Liquid polyurethane elastomer precursor is fed into the application zone of the equipment through feed pipe 7 and the liquid precursor forms a bank 8 of material in the angular nip formed by the portion of the release belt between rolls 5 and 5' and that portion of the substrate directly underneath. The polyurethane elastomer is spread evenly over the substrate where the bank contacts the movable surfaces and its final thickness is adjusted by the clearance existing between the substrate and the release belt as they pass under roll 5'. Throughout the application zone and beyond, the substrate is supported by a rigid base plate 9. Beyond roll 5', the position of the release belt is regulated by a back up plate 10. As the substrate and the release belt pass between the back up plate and the rigid face plate, they form a traveling mold in which the liquid precursor can be cured to such a degree that it is no longer free to flow of its own weight. A cross section of this portion of the apparatus is shown in FIGURE 2. The plane of this cross section is indicated by line AA' on FIGURE 1. Referring to FIGURE 2, substrate 1 is supported by a rigid base plate 9. Release belt 4 is in contact with the back up plate 10. Polyurethane elastomer 12 which may still be liquid, partially cured or essentially cured is contained between the release belt and the substrate. The rigid base plate is channeled to provide edges 13 and 13' for the traveling mold section. These edges may be made of highly polished steel or if difficulty is encountered with the polyurethane elastomer sticking to the edges, they may be made of polytetrafluoroethylene inserts. Referring back to FIGURE 1, it should be noted that the length of the release belt need only be great enough to permit the particular polyurethane elastomer being applied to reach such a state of cure that it is no longer tacky. Once the elastomer is tack-free, it may be separated from the release belt and further curing of the elastomer, if required, can be acocmplished by passing the coated substrate through an oven placed beyond roll 6. FIGURE 1 does not include a curing oven. During this curing operation, there is no need to maintain the coated substrate in a traveling mold; however, it should be noted that many polyurethane elastomers should not be flexed until a full state of cure has been reached. For this reason, the preferred cure section beyond the release belt amounts to a planar extension of rigid base plate 9. If a very rapid curing precursor is employed a cure section may not be required beyond the release belt.

The essential feature of the present process resides in the manner in which the self-curing liquid polyurethane elastomer precursor is applied to the two converging sheets which form the nip of no greater than about 15°. This portion of the apparatus is diagramed on a larger scale in FIGURE 3 to assist in clarifying its function. Again as in FIGURE 1 the lower moving sheet is the substrate which is to be coated. This figure shows the manner in which the elongated nip is formed by a planar portion of substrate 1 and at least a planar portion of the release belt which extends over and between rolls 5 and 5'. The liquid precursor is introduced into the nip through feed pipe 7 and drawn into the nip by the movement of the substrate 1. In order to minimize the amount of liquid precursor held up in the nip and at the same time increase the area of contact between the liquid precursor and the substrate to be coated, the planar portions of the substrate and the release belt which form the nip must include a small angle of no greater than about 15°. In actual practice, it has been found that angles as small as 1° may be used for the included angle of the nip. Difficulty is experienced with smaller angles because the portion of the release belt between rolls 5 and 5' comes so close to paralleling the substrate that the dimensions of the nip approach the final thickness of the coated fabric. Under these conditions the liquid precursor may easily form a bank in front of roll 5 so that the advantage of the elongated nip of the present invention is lost. If the included angle between the planar portions of the substrate and the release belt is increased beyond 15°, the nip may accommodate too great a volume of liquid precursor and operation will approach that of conventional coating equipment with all of the attendant disadvantages. Preferred values of this angle are in the range of 3° to 7°. Using these angles, one can easily fill the nip for a considerable distance up-stream from roll 5' without over-filling beyond roll 5 and still avoid problems resulting from excessive holdup times. In order to guarantee that adequate contact is made between the liquid precursor and the substrate, the bank included in the nip should extend up-stream from the point where the substrate and release belt first reach their closest point of convergence for at least a distance of two inches. The length of the bank for a particular liquid polyurethane precursor depends upon the work time of the precursor. Determination of the work time is discussed hereinafter. The location of the distance which defines the length of the bank in the nip is shown in FIGURE 3 as $P_1$ and $P_2$ with the distance included by them being labeled L. With relatively rapid curing liquid precursors with work times of about 2 to 20 minutes, substrate moving rates of the order of two to four feet per minute, and included angles of 3° to 7°, the preferred length of the bank formed by the liquid precursor in the nip is in the range of three to twenty-four inches.

The arrangement described above possesses a number of advantages for the application of self-curing liquid polyurethane elastomer precursors to form polyurethane sheets and when applying the precursors to substrates. First, the sheets forming the nip are renewed continuously so that build-up on stationary distributors of one type or another is eliminated. Second, the area of contact between the two moving sheets or alternatively the release surface and the substrate and the liquid precursor is relatively large so as to permit good contact or penetration and even distribution of material while employing a minimum holdup of material in the nip. Finally, the motion of the substrate and release belt in the nip relative to the precursor in the bank, creates pressure near roll 5' and further guarantees good contacting or penetration as required.

It will be obvious to those skilled in the art that the planar section of the release belt between rolls 5 and 5' can be replaced by passing the release belt over a single roll having a very large diameter. With the preferred dimensions of 3° to 7° in the included angle and a nip bank length of three inches to twenty-four inches, the size of a single roll which will form a nip approaching these dimensions may be prohibitive. Those skilled in the art will also recognize that the apparatus shown in FIGURE 1 in which the substrate to be coated moves horizontally, may be operated in a vertical position with the substrate moving downward. If the substrate is to be coated on both sides, the equipment shown in FIGURE 1 may be used by passing the material through the machine twice. Coating of both sides of a substrate may be accomplished simultaneously by employing the equipment shown in FIGURE 4 which has reference numbers identical to those of FIGURE 1. This equipment is installed vertically so that the substrate passes downward through the apparatus. Release belts are placed on both sides of the substrate with the requirements in regard to nip angle and the length being met on both sides of the substrate. This type of apparatus works well when a thin coating is required on both sides of a given substrate. As might be expected, difficulty may be encountered in this equipment when thick coatings are required on both sides of a substrate due to uncertain positioning of the substrate in the traveling mold portion of the apparatus.

The process of the present invention may also be used to prepare laminated products if release belt 4 is replaced with a continuous length of fabric or some other flexible substrate. In this way, conveyor belts and power transmission belts having several plies of fabric can be fabricated.

The process may be used for preparing uniform sheets of polyurethane elastomers by replacing the substrate with a second release belt. This is a convenient way to prepare polyurethane elastomer sheets ranging in thickness from about five-thousandths to one-quarter of an inch in thickness. This sheet stock is useful for preparing gaskets, packing and washers. It is useful for covering bumpers and crash pads which are employed in rough service. In addition, the material can be used for tank lining. Thin sheets of polyurethane elastomer may be used for resurfacing worn conveyor belts.

The process of this invention is not intended to be limited to the apparatus as described in the foregoing discussion.

The self-curing polyurethane elastomer precursor chosen for any given coating application will depend on the substrate being coated, the thickness of the coating required and the ultimate conditions to which the coated substrate will be subjected in use. For example, a precursor chosen for coating fabrics to be used as conveyor belts should form an elastomer with a fair degree of flexibility and good abrasion resistance. In addition, if the coating is to furnish some of the strength of the belt, a high modulus, high tensile elastomer would be desired and the liquid precursor would be chosen with this in mind. In the case of coated substrates to be employed as chute linings or to serve in pneumatic conveyors, flexibility normally would not be too important; however, outstanding abrasion resistance would be desired.

Once the elastomer has been chosen the maximum linear coating rate may be calculated from knowledge of the curing rate of the elastomer under the temperature conditions existing in the particular coating apparatus available and the length of the coating apparatus available. The amount of liquid polyurethane elastomer precursor which will be consumed per unit of time can then be calculated readily from a knowledge of the rate at which the apparatus will be operated and the thickness of the coating which is to be applied. The mathematical product of the rate at which precursor is consumed in volume per unit of time and the average residence time of the liquid precursor in the elongated nip sets the volume of material which will be contained in the bank of the elongated nip. The average residence time selected must not exceed the work time of the particular liquid elastomer precursor under consideration. Work time may be determined conveniently by forming a layer about one-half inch in depth of freshly mixed self-curing liquid polyurethane elastomer precursor in an aluminum pan having dimensions of about 6 inches by 5 inches by 1 inch. The layer of material is then worked by cutting and spreading with a metal spatula until the liquid precursor reaches a consistency such that it tends to tear when cut, fails to rejoin after cutting and cannot be spread. These conditions indicate that the precursor is no longer workable and the time elapsed from formation of the precursor until the precursor reaches this state is the work time. Work time is of longer duration than is pot life, the latter being described as the length of time which must elapse from fresh mixing of a liquid precursor until it reaches such a consistency that it will no longer readily flow of its own weight. As previously indicated, the average residence time selected should be less than the work time for the specific precursor under consideration. Generally, an average residence time which is no greater than about 80% of the work time is preferred. Once having selected the volume of material to be contained in the bank of the nip, the angle of the nip and the length of the bank should be set as near as possible to the preferred values of 3° to 7° and three inches to twenty-four inches. It may be necessary or desirable to deviate from these preferred values to make allowances for special conditions resulting from the nature of the liquid precursor, the substrate to be coated or impregnated, or the rate of operation. For example, with very reactive liquid precursors having short work times, it may be necessary to employ very small angles so that the length of the bank in the nip is adequate to insure proper contact while the volume of precursor in the nip is small. Further, if the nature of the substrate makes it difficult to achieve good contact, as would be the case with a rough fabric, decreasing the angle of the nip which automatically increases the area of contact is desirable if the volume of precursor remains the same in the bank. In general, the bank length should be increased when impregnation of the substrate is desired. With slow curing liquid precursors, a relatively large quantity of material may be contained in the nip and greater angles may be used to advantage. Larger angles and shorter bank lengths may also be used to advantage when the material being coated is relatively smooth and easy to contact uniformly.

As previously indicated, any self-curing liquid polyurethane elastomer precursor can be used in the present invention. In describing precursors, it is convenient to classify them as derived by prepolymer methods or "one-shot" methods. The terms prepolymer and "one-shot" are well known in the urethane foam trade, and they may be employed with reference to the preparation of polyurethane elastomers with much the same meaning.

The prepolymer method for preparing polyurethane elastomers involves the initial preparation of an isocyanato-terminated prepolymer which is reacted in turn with one or more curing agents or chain-extending agents. The curing or chain-extending reaction may be carried out in the presence of catalysts if it is desirable to increase the rate of cure. In general, prepolymers represent the reaction product of a polymeric glycol with about 1.25 to 2.25 moles of an aromatic diisocyanate. The polymeric glycol employed usually has a molecular weight in the range of about 800 to 3000. While aromatic diisocyanates are preferred because of their reactivity, prepolymers may be made by employing aliphatic diisocyanates. The self-curing polyurethane elastomer precursor is prepared by mixing a prepolymer with a curing agent which may be a diamine, a low molecular weight glycol alone or in admixture with a low molecular weight triol or mixtures of such curing agents. In general, any low molecular weight difunctional compound capable of reacting with isocyanato groups may be used to cure a prepolymer to a finished elastomer. The mixture of isocyanato terminated prepolymer and curing agent represents a self-curing liquid polyurethane elastomer precursor. It will cure to an elastomer without the addition of any other ingredients. Prepolymer systems have been studied extensively and are preferred, at present, for use in the process described in this invention.

In preparing polyurethane elastomers by the "one-shot" method, one simultaneously mixes polymeric glycol, diisocyanate and curing agent, plus any catalyst desired. The resulting mixture represents the self-curing liquid polyurethane elastomer precursor in this instance. These systems usually possess low viscosity immediately after mixing. While this may be an advantage in some applications, it is not particularly desirable in carrying out the process of the present invention. A serious drawback in employing the "one-shot" method occurs when a diamine curing agent is used. This difficulty arises because the isocyanato-amine reaction takes place very rapidly relative to the isocyanato-hydroxyl group reaction. In order to get good cures, it has been found that the two reaction rates must be brought closer together by the use of catalysts. Catalysts which are relatively specific for the isocyanato-hydroxyl group reaction may be used for this purpose. Representative examples of such catalysts are ferric acetylacetonate, dibutyl tin dilaurate and stannous 2-ethylhexanoate.

It should be mentioned that a third method representing a compromise between the prepolymer and the "one-shot" methods is available. This technique corresponds to the semi-prepolymer process used for making polyurethane foams. In preparing elastomers by this procedure, only a portion of the polymeric glycol which is required in the ultimate elastomer is reacted with all of the diisocyanate required. The result is a prepolymer containing a large excess of free diisocyanate. The other component of this system is prepared by mixing the remainder of the required polymeric glycol with suitable curing agents and catalysts, if desired. When these two portions of material are mixed together, a self-curing liquid polyurethane elastomer precursor is formed. This method suffers from the disadvantage of uneven reaction rates if a diamine curing agent is involved for the same reason given in the discussion of the "one-shot" method.

Representative examples of polymeric glycols which have been found useful in the preparation of polyurethane elastomers include both polyether glycols and polyester glycols. The more common polyether glycols are polymers of alkylene oxides such as ethylene oxide, 1,2-propylene oxide and mixtures thereof and polymers formed by the acid polymerization of tetrahydrofuran. Preferred polyether glycols are polypropyleneether glycol and polytetramethyleneether glycol. Polyalkylene-aryleneether glycols and polyalkyleneether-thioether glycols are also useful in the preparation of polyurethane elastomers. These are described in U.S. 2,808,391 and French 1,128,561, respectively. The polyester glycols which are useful in the preparation of polyurethane elastomers generally are prepared by reacting about equimolar proportions of a low molecular weight glycol and a low molecular weight dibasic acid, with the provision that the glycol component is employed in slight excess to furnish terminal hydroxyl groups. Examples of preferred glycols for preparing polyester glycols include ethylene glycol, 1,2-propylene glycol, and butanediol-1,4. Mixtures of these glycols may be used to advantage on occasion. Succinic, adipic and glutaric acids are representative of preferred dibasic acids for use in the preparation of polyester glycols. Aromatic dicarboxylic acids may also be used, but in general the incorporation of a large proportion of such units in a polyester based polyurethane leads to a material which is more plastic than elastic.

As previously stated, aromatic diisocyanates are preferred for the preparation of most polyurethane elastomers. Elastomers derived from aromatic diisocyanates are generally tougher than those derived from aliphatic diisocyanates and, in addition, liquid precursors derived from aromatic diisocyanates generally cure more rapidly. Preferred diisocyanates include 2,4-tolylene diisocyanate, 2,6-tolylene diisocyanate, 4,4'-diisocyanatodiphenylmethane, 1,4-phenylene diisocyanate and 4,4'-diisocyanatodiphenyl. Hexamethylene diisocyanate and 4,4'-diisocyanatodicyclohexylmethane are representative of aliphatic diisocyanates which may be useful.

A variety of curing agents or chain-extending agents have been employed in preparing polyurethane elastomers. Generally, diamines are preferred as curing agents because of their high reactivity and the general toughness of the elastomers which they produce. Aliphatic diamines can be used for the curing reaction, but usually they are sufficiently basic to cause compositions containing free isocyanato groups to gel almost instantaneously. This reaction is so fast that it is often difficult to effect proper mixing of the diamine with the isocyanato group containing composition. For this reason, aromatic diamines are preferred curing agents and aromatic diamines having lower basicity are especially preferred. Examples of aromatic diamines which are preferred as curing agents include 4,4'-diaminodiphenylmethane, 3,3'-dichloro-4,4'-diaminodiphenylmethane, 3,3'-dichloro-4,4'-diaminodiphenyl, 3,3'-dimethyl-4,4'-diaminodiphenylmethane and 4,4'-diaminodiphenyl ether. Aromatic diamines bearing both amino groups on a single benzene ring may also be used as curing agents, but difficulty may be experienced in handling diamines of this type because they are usually more basic than the preferred diamines listed above. 2,4-tolylene diamine, 1,3-phenylene diamine and 1,4-phenylene diamine are representative of the more reactive aromatic diamines. When diamines are employed as curing or chain-extending agents, they should be added in amounts of about 70% to 105% of the quantity theoretically required to react with the free isocyanato groups which are available for the curing reaction.

Low molecular weight glycols or polyols can be used as chain-extenders or curing agents in preparing a wide variety of polyurethane elastomers. Polyol cures generally result in the production of softer elastomers than would be obtained by curing the corresponding composition with a diamine. Preferred glycol curing agents include materials such as ethylene glycol, 1,2-propylene glycol, diethylene glycol, neopentyl glycol, butanediol-1,3 and butanediol-1,4. These glycols may be used alone or in admixture with a minor proportion of a polyol which provides cross linking. Representative polyols which may find use in this application include glycerin, 1,2,6-hexanetriol, 1,1,1-trimethylolpropane, 1,1,1-trimethylolethane, pentaerythritol and sorbitol. In employing these curing agents, the equivalents of hydroxyl groups in the curing agent should be about equal to the equivalents of isocyanato groups available for reaction in the curing step.

As previously mentioned, catalysts may be employed to advantage in preparing certain polyurethane elastomers. Ferric acetylacetonate and related chelates of ferric iron, dibutyl tin dilaurate, stannic chloride, stannous 2-ethylhexanoate and a variety of other tin compounds may be used to increase the rate of the isocyanato-hydroxyl group reaction. Tertiary amines such as triethylene diamine, N-ethylmorpholine, and 1,3-bis(dimethylamino) butane may be useful on occasion for catalyzing the isocyanato-hydroxyl group reaction, but the other catalysts previously listed are preferred because the tertiary amines may cause undesirable side reactions involving the reaction of isocyanato groups with themselves. If necessary to increase the rate of the amino-isocyanato group reaction, one can employ aliphatic dicarboxylic acids such as succinic, adipic, and glutaric acids.

In the absence of catalysts and at a given temperature, the rate of cure of a self-curing liquid polyurethane elastomer precursor depends largely on the intermediates which are employed in preparing the precursor. At the same time, these intermediates substantially control the physical properties of the cured polyurethane elastomer. Soft, flexible elastomers are in general produced by employing polymeric glycols of relatively high molecular weight, unsymmetrical and/or low molecular weight diisocyanates and glycol curing agents. Conversely, tougher elastomers having higher hardness result from using polymeric glycols of relatively low molecular weight, symmetrical and/or high molecular weight diisocyanates and diamine curing agents. Elastomers of exceptional toughness and hardness can be prepared by employing formulations which contain free diisocyanate in excess of the amount of polymeric glycol employed and adding sufficient curing agent to react with any isocyanato groups which are in excess after the reaction between diisocyanate and polymeric glycol has occurred. An excellent discussion of the effect of structure on polyurethane elastomer properties has been published in Rubber Chemistry and Technology, 33, pages 1259–1292, 1960. Using the very general principles set forth here plus additional information which is available in references such as the one cited, it is possible to select suitable intermediates for preparing polyurethane elastomers having a variety of properties.

A preferred class of self-curing liquid polyurethane elastomer precursors for use in the process of the present invention may be made from polytetramethyleneether glycol-toluene diisocyanate prepolymers cured with diamines or with low molecular weight glycols containing minor amounts of polyol. To prepare the prepolymers, polytetramethylene ether glycol having a number average molecular weight in the range of 800–2500 is reacted with 1.5 to about 2.5 moles of 2,4-tolylene diisocyanate or an isomeric mixture of 2,4-tolylene diisocyanate containing up to about 20% 2,6-isomer. If harder elastomers are desired, up to about 2 moles of a low molecular weight glycol such as butanediol-1,3 or diethylene glycol may be mixed per mole of polytetramethylene ether glycol and the resulting mixture of glycols reacted with 1.5 to 2.5 moles of diisocyanate per mole of glycol mixture. All of these prepolymers may be converted to self-curing liquid polyurethane elastomer precursors by the addition of a diamine curing agent. The preferred diamine curing agent is 3,3'-dichloro-4,4'-diaminodiphenylmethane which should be employed in an amount equivalent to 70 to 105% of the available isocyanato groups contained in the prepolymer. The cure rates observed for this series of prepolymers when reacted with the preferred diamine curing agent are such that most of the compositions can be used without difficulty in the process of the present invention. If rapid curing is desired, part or all of the dichlorodiamine can be replaced with 4,4'-diaminodiphenylmethane. These prepolymers may also be cured to elastomers by the addition of a glycol such as butanediol-1,4 containing 10–30% of a triol such as trimethylolpropane. With this curing system, the quantity of mixed diol-triol curing agent employed should be such that the number of hydroxyl groups added is about equivalent to the isocyanato groups contained in the prepolymer. The resulting elastomers are much softer than those obtained with the diamine cure. The cure rate observed with the diol-triol system is relatively slow but may be increased by the use of suitable catalysts such as ferric acetylacetonate.

In employing the process of the present invention, it is necessary to furnish freshly prepared self-curing liquid polyurethane elastomer precursor to the nip of the coating equipment on a continuous basis. Equipment for combining the two or more streams of material which make up the liquid polyurethane elastomer precursors described above is commercially available and known to those skilled in the art. In essence, this equipment consists of accurate metering facilities which feed the required ingredients at controlled rates into an intensive mixing zone from which the self-curing liquid polyurethane elastomer precursor emerges ready for use. The requirements for metering and mixing have been discussed in a bulletin entitled "Processing Liquid Urethane Elastomers," by J. A. Hanzel, published by the Elastomer Chemicals Department, E. I. du Pont de Nemours and Co., Inc., Wilmington, Delaware, dated August 7, 1961.

In order to operate the process of the present invention successfully, it is necessary to furnish freshly mixed liquid precursor to the nip of the machine at a rate equal to that at which precursor is consumed. If this condition is not met, the length of the bank in the nip will increase or decrease beyond useful limits. In actual practice, the rate at which precursor is furnished or the rate at which it is consumed must be adjusted periodically to maintain the length of the bank in the nip constant. The rate at which precursor is furnished may be changed by increasing or decreasing the rates at which ingredients are metered into the mixing zone used for preparing the precursor. While this may be accomplished readily with certain types of metering equipment, it often requires separate adjustment of two metering pumps. For this reason, it is often more convenient to vary the rate at which precursor is consumed. This is easily accomplished by varying the rate at which the substrate passes through the machine. The greater this rate, the greater is the consumption of precursor per unit of time. This type of adjustment can be accomplished by driving the powered take-up reel with a variable speed drive.

The following examples will better illustrate the nature of the present invention; however, the invention is not intended to be limited to these examples. Parts are by weight unless otherwise indicated.

*Example 1*

The equipment employed in this example may be described by referring to FIGURE 1. The overall length of the coating equipment measured along rigid base plate 9 is about 25 feet. The self-curing liquid precursor employed in this example cures with sufficient rapidity that no cure section is required beyond the point at which the release belt is removed from the coated substrate. Rolls 5, 5' and 6 are about 6 inches in diameter and about 18 inches in width. The center of roll 5 is located about 1 foot from the front end of the rigid base plate. The distance between the centers of rolls 5 and 5' is about 4 feet. Roll 6 is positioned so that its center is about 1 foot from the far end of rigid base plate 9. The release belt 4 is about 10 inches wide and is constructed of glass fabric which has a smooth facing of polytetrafluoroethylene. Back-up plate 10 extends between roll 5 and 6. The channel in the rigid base plate, which is best seen by referring to FIGURE 2, is about 10 inches wide. The lower face of the back-up plate is machined to fit this channel. Approximately the last 15 feet of the rigid base plate 9 is maintained at an elevated temperature by steam coils carrying 135 p.s.i.g. pressure steam. This raises the temperature of the coated fabric to about 100 to 110° C. The portion of the back-up plate 10 which opposes the heated portion of the base plate is also heated by steam coils.

A continuous length of 10 inch wide nylon multi-warp belt carcass, 68.5 ounces to the square yard, is coated with a layer of polyurethane elastomer about 0.02 inch thick in the following manner. The belt carcass has an overall thickness uncompressed of about 0.14 inch. Roll 5' is adjusted vertically so that the clearance between the release surface passing over it and the channel bed of rigid base plate 9 is about 0.16 inch. Roll 5 is adjusted vertically so that the included angle between the portion of the release belt between roll 5 and 5' and the rigid base plate is about 5°. Polytetrafluoroethylene fillets cut to an angle of about 5° are inserted in the nip between the release belt and the rigid base plate, spaced about 10 inches apart. These inserts or fillets prevent the liquid precursor from flowing from the sides of the nip when the coating apparatus is in use.

The self-curing liquid polyurethane elastomer precursor employed in the present example is derived from a prepolymer and a diamine curing agent. The required prepolymer is prepared by adding about 74.2 parts of polytetramethyleneether glycol having a number average molecular weight of about 1000 to 31.8 parts of toluene 2,4-diisocyanate contained in an agitated vessel. The addition of the glycol is completed as rapidly as possible without exceeding a temperature of 80° C. Following the addition, the reaction mass is held at a temperature of about 80° C. for 4 hours. It is then cooled to room temperature and stored in dry, air-tight containers until required for use. The self-curing liquid precursor is produced by mixing about 26.8 parts of 3,3'-dichloro-4,4'-diaminodiphenylmethane for every 100 parts of prepolymer in a low volume high speed mixing head. Material exiting from the mixing head is directed into the nip of the coating machine by a short length of pipe. This precursor has a work-time of 2.5 minutes as measured by "working" the material with a spatula. The pot life is about 2 minutes. The cured elastomer formed from this precursor has the following physical properties:

Tensile at break, p.s.i. _____ 8400
Elongation at break, percent _____ 310
Rebound resilience _____ 44
Modulus, 50% elongation, p.s.i. _____ 1900
Hardness, Shore D _____ 61

To start the run, the belt carcass is drawn through the machine at a rate of about 2.5 feet per minute and the self-curing liquid precursor is fed into the nip at a rate of about 0.125 lb. per minute. The feed rate of the belt carcass through the machine is not sufficient to consume all of the liquid precursor and as a result, the quantity of precursor contained in the bank of the nip will increase with time. As the length of the bank in the nip approaches 3 inches, the rate at which the belt carcass is passing through the machine is increased from about 2.5 feet per minute up to about 3.0 feet per minute. At the higher belt speed, liquid precursor is consumed at a rate which closely matches its feed rate into the nip. By making minor variations in the rate at which the belt carcass travels through the machine, the length of the bank in the nip may be maintained at about 3 inches. The quantity of liquid precursor contained in the nip under these conditions is 0.27 lb. and at the rate of consumption of 0.125 lb. per minute, the residence time of precursor in the nip is about 2.2 minutes. This residence time is 75% of the work time of this precursor. The belt carcass leaving the machine has an even coating of cured polyurethane elastomer on one side. The thickness of the coating is about 0.02 inch and corresponds to a weight increase of 0.05 lb. per square foot. By increasing the clearances in the coating machine an additional 0.02 inch and following the procedure given above, the belt carcass may be coated on the reverse side by passing it through a machine a second time.

By increasing the clearances in the machine to 0.65 inch, a coating of cured polyurethane elastomer which is ⅛ inch thick may be applied to a second length of the nylon belt carcass. Belt carcass is passed through the machine at a rate of about 3 feet a minute and liquid precursor is fed into the nip at the rate of about 0.75 lb. per minute. In applying this thicker coating, the length of the bank in the nip can be allowed to increase to about 6–7 inches without the residence time exceeding the work time of the liquid precursor. Fabric leaving the end of a machine contains a uniform, cured layer of polyurethane elastomer which is about ⅛ inch thick. The back of the cloth may be coated by following the procedure described above.

*Example 2*

The coating equipment employed in this example is the same as that described in Example 1 with the exception that a 50 foot extension is attached to the base plate of the coating equipment and the take-up reel 3 is moved beyond this extension. This extension is enclosed in the insulated sheet metal tunnel. The atmosphere in the tunnel is maintained at a temperature of about 110° C. by supplying it with forced hot air. The self-curing liquid polyurethane elastomer precursor used in this example cures at such a rate that it is tack-free, under the coating conditions employed, by the time the coated fabric passes the end of the release belt. However, the additional curing section provided by the oven is required to take the material from a tack-free state to a cured state.

The prepolymer used in this example is prepared by reacting 100 parts of polytetramethyleneether glycol having an average number molecular weight of about 1000 with 27.8 parts of 2,4-toluene diisocyanate. These ingredients are reacted by adding the glycol to the diisocyanate at a temperature below 80° C., followed by a holding period of 4 hours at 80° C. The mass is then cooled to room temperature and stored until required. A self-curing liquid polurethane precursor is prepared from this prepolymer by mixing 12.5 parts of molten 3,3'-dichloro-4,4'-diaminodiphenylmethane with about 100 parts of prepolymer. Mixing is accomplished continuously in a high speed mixing head having a minimum hold up. The liquid precursor has a work time of 20 minutes as determined by working with a spatula as described previously.

Ten inch wide nylon multi-warp belt carcass, 68.5 ounces to the square yard, is coated with the elastomer of this example following the procedure given in Example 1. The equipment is operated at the same nip angle and with the same tolerances for a given coating thickness. Because the liquid elastomer precursor has a longer work life than that employed in Example 1, the length of the bank in the nip may be increased conveniently to about 12 inches even when the coating thickness is only 0.02 inch.

The elastomer formed from the self-curing liquid precursor of this example has the following properties:

Tensile at break, p.s.i. _____ 4500
Elongation at break, percent _____ 450
Resilience (Bashore), percent _____ 45
Tear strength (ASTM D–470) p.s.i. _____ 85
Hardness, Shore A _____ 96
Abrasion resistance (Bureau of Standards Index) __ 180

Nylon belt carcass with a coating of 0.125 inch of this elastomer on one side and an 0.02 inch coating of the same elastomer on the reverse side is flexible and has outstanding abrasion resistance. It is ideal for use in conveyor belts.

A ten inch width of woven cotton sand belting, Style 513, single ply, 10 ounces per square yard, is coated with a 0.06 inch layer of the elastomer employed in this example. The resulting material is flexible, but does not stretch appreciably because of the cotton duck backing. The material is useful for lining duct work or chutes which are exposed to abrasive materials.

As many widely different embodiments of this invention may be made without departing from the spirit and scope thereof, it is to be understood that this invention is not limited to the specific embodiments thereof except as defined in the appended claims.

What is claimed is:

1. In a continuous process for preparing solid elastomeric polyurethane materials by passing a self-curing liquid polyurethane precursor between and in contact with two sheets moving at the same speed and maintained at a predetermined separation, and containing the precursor between said sheets while said precursor cures to a tack-free polyurethane, the improvement which comprises initially placing said precursor in a planar nip having an angle no greater than about 15° formed by said sheets moving at the same speed and converging to said predetermined separation while maintaining a bank of said percursor in said nip of at least two inches as measured back from the first point where said sheets reach their narrowest point of convergence, with the proviso that the average residence time of said precursor in said nip being no greater than the work time of said precursor.

2. A process as described in claim 1 where said self-curing liquid polyurethane precursor is obtained by reacting 3,3'-dichloro-4,4'-diaminodiphenylmethane, a glycol selected from the group consisting of polytetramethyleneether glycol and polypropyleneether glycol and a diisocyanate selected from the group consisting of (a) 2,4-tolyene diisocyanate and (b) mixtures of 2,4-tolylene diisocyanate and 2,6-tolylene diisocyanate containing up to 20% by weight of said 2,6-tolylene diisocyanate.

3. In a continuous process for preparing solid elastomeric polyurethane materials by passing a self-curing liquid polyurethane precursor between and in contact with two sheets moving at the same speed and maintained at a predetermined separation, and containing the precursor between said sheets while said precursor cures to a tack-free polyurethane, the improvement which comprises initially placing said precursor in a planar nip having an angle no greater than about 15° formed by said sheets moving at the same speed and converging to said predetermined separation while maintaining a bank of said precursor in said nip of at least two inches as measured back from the first point where said sheets reach their narrowest point of convergence, and removing one of said sheets after said polyurethane cures to a tack-free state thereby forming a polyurethane coated substrate, with the proviso that the average residence time of said precursor in said nip being no greater than the work time of said precursor.

4. A process as described in claim 3 where said sheet which is coated is a fibrous sheet thereby forming a polyurethane coated fibrous substrate.

5. In a continuous process for preparing solid elastomeric polyurethane materials by passing a self-curing liquid polyurethane precursor between and in contact with two sheets moving at the same speed and maintained at a predetermined separation, and containing the precursor between said sheets while the said precursor cures to a tack-free polyurethane, the improvement which comprises initially placing said precursor in a planar nip having an angle no greater than about 15° formed by said sheets moving at the same speed and converging to said predetermined separation while maintaining a bank of said precursor in said nip of at least two inches as measured back from the first point where said sheets reach their narrowest point of convergence, and removing both of said sheets after said polyurethane becomes tack-free thereby forming a solid sheet of polyurethane material, with the proviso that the average residence time of said precursor in said nip being no greater than the work time of said precursor.

6. In a continuous process for preparing solid elastomeric polyurethane materials by passing a self-curing liquid polyurethane precursor between and in contact with two sheets moving at the same speed and maintained at a predetermined separation, and containing the precursor between said sheets while said precursor cures to a tack free polyurethane, the improvement which comprises initially placing said precursor in a planar nip having an angle of about 3° to 7° formed by said sheets moving at the same speed and converging to said predetermined separation while maintaining a bank of said precursor in said nip of at least two inches as measured back from the first point where said sheets reach their narrowest point of convergence, with the proviso that the average residence time of said precursor in said nip being no greater than the work time of said precursor.

7. In a continuous process for preparing solid elastomeric polyurethane materials by passing a self-curing liquid polyurethane percursor between and in contact with two sheets moving at the same speed and maintained at a predetermined separation, and containing the precursor between said sheets while said precursor cures to a tack-free polyurethane, the improvement which comprises initially placing said precursor in a planar nip having an angle of about 3° to 7° formed by said sheets moving at the same speed and converging to said predetermined separation while maintaining a bank of said precursor in said nip of at least two inches as measured back from the first point where said sheets reach their narrowest point of convergence, and removing one of said sheets after said polyurethane cures to a tack-free state thereby forming a polyurethane coated substrate with the proviso that the average residence time of said precursor in said nip being no greater than the work time of said precursor.

References Cited by the Examiner

UNITED STATES PATENTS

| | | | |
|---|---|---|---|
| 2,500,728 | 3/1950 | Williams | 264—175 |
| 3,047,449 | 7/1962 | Coble | 264—257 |
| 3,167,603 | 1/1965 | Lillie | 264—171 |

FOREIGN PATENTS

| | | |
|---|---|---|
| 168,075 | 7/1954 | Australia. |

ROBERT F. WHITE, *Primary Examiner.*

S. A. HELLER, *Assistant Examiner.*